Dec. 16, 1924.  1,519,546

M. A. MARQUETTE

TIRE BUILDING APPARATUS

Filed June 22, 1922  2 Sheets-Sheet 1

INVENTOR
Melvon A. Marquette
BY
ATTORNEY

Dec. 16, 1924.                                        1,519,546
M. A. MARQUETTE
TIRE BUILDING APPARATUS
Filed June 22, 1922            2 Sheets-Sheet 2
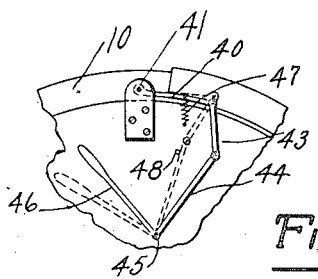
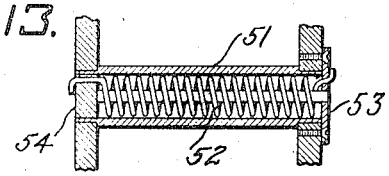
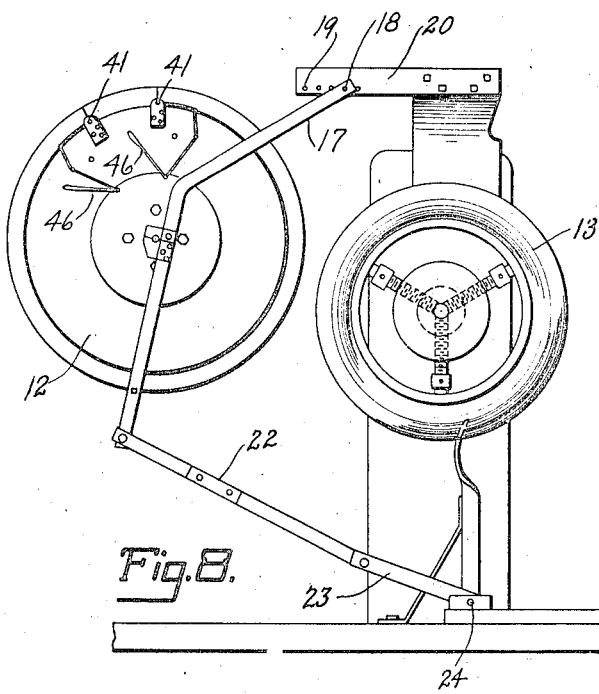
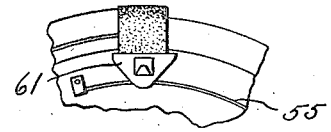
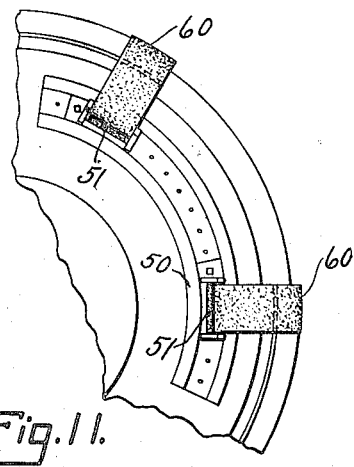
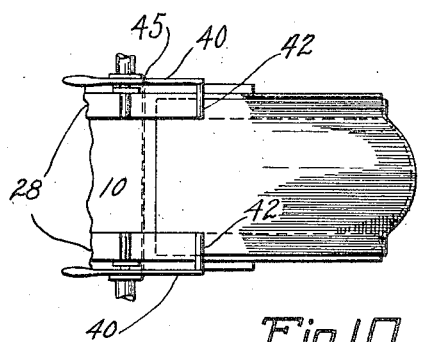
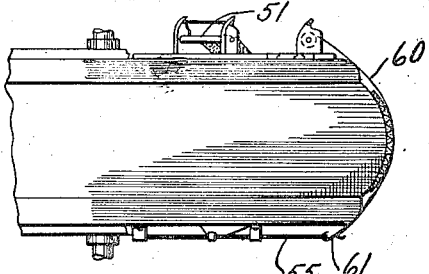
INVENTOR
Melvon A. Marquette
BY
ATTORNEY Patented Dec. 16, 1924.

1,519,546

UNITED STATES PATENT OFFICE.

MELVON A. MARQUETTE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

TIRE-BUILDING APPARATUS.

Application filed June 22, 1922. Serial No. 570,211.

*To all whom it may concern:*

Be it known that I, MELVON A. MARQUETTE, a citizen of the United States of America, residing at Chicopee Falls, in the county of Hampden and State of Massachusetts, have invented certain new and useful Improvements in a Tire-Building Apparatus, of which the following is a specification.

My present invention relates to the building of laminated articles such as the outer casings of pneumatic tires used on automobiles. It has for its object the improvement of the building of such articles in various particulars, more especially with regard to the operations of applying the several laminations and causing them to conform to the convex annular core or former upon which they are customarily constructed. More specific and detailed objects of the invention will appear from the ensuing description and the appended claim.

The invention will now be described with particular reference to the accompanying drawings, in which—

Fig. 8 is a view similar to Fig. 1 showing a slightly modified device adapted first to position a lamination and then to conform it to the core;

Fig. 9 is a detail thereof on a larger scale;

Fig. 10 is a fragmentary plan view of the apparatus shown in Figs. 8 and 9;

Fig. 11 is a side view of parts shown in Fig. 8, illustrating a modified form of clamping device;

Fig. 12 is a detail of the reverse side of the portion of the apparatus shown in Fig. 11;

Fig. 13 is a sectional detail of parts shown in Fig. 11; and

Fig. 14 is a plan view of the parts shown in Fig. 11.

Figure 6:
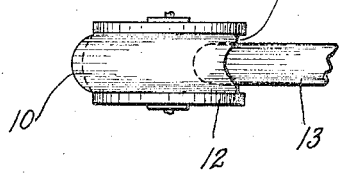
Fig. 6 is a top view of the stitching device in use.

The invention will be described with reference to the operation of conforming a tire tread to the composite tire carcass upon which it is to be assembled, but it should be understood that the invention has applicability to the shaping of other material, such as the fabric plies which go to build up the carcass. It will, however, be necessary to illustrate only the tread operation, as the other variations will be completely understood by analogy therefrom. Described in the simplest terms, the apparatus of the present invention comprises in one of its aspects a member adapted to engage the material to be shaped by rolling and substantially yielding surface pressure contact, as opposed to the rigid and line contact obtained by the usual rotating stitcher wheels used for the same work. This member is shaped and operated so as to conform the material to the core progressively and with a simultaneous pressing and smoothing action which effectively causes all portions of the material to adhere and remove all traces of entrapped air. It is a well recognized defect in the ordinary form of stitching devices that they attach the material to underlying layers only along a spiral path corresponding to that along which the stitching device is moved down the side of the article. The present improved apparatus entirely obviates this defect, pressing the material at all points and at the same time exerting a novel smoothing and stretching action to cause the material to lie smoothly in place.

The best form I have thus far discovered in which my invention can be embodied is that illustrated in the drawings, in which the stitching device is shown as composed of an inflatable bag 10 mounted in a circumferential recess 11 of a drum 12 suitably mounted as will be described so that it may be moved towards and away from the core or former 13. The particular shape in which the bag is formed, and the shape of the recess in which it is located, both have a bearing upon the effectiveness with which the apparatus performs its work, and will be described more in detail after the general operation of the device has been considered. It will suffice to say at this point that the sides of the cavity furnish support for the bag so that the latter can exert a considerable pressure upon the sides of the core so as to press down the edge portions of the tread material.

The core 13 is carried in any usual or suitable manner upon a chuck 14 which in turn is mounted upon a rotatable shaft 15. Any desired means can be employed to rotate the shaft, or it may be rotated manually, but preferably the usual intermittent drive is used, by means of which the core can be rotated at the desired speed or held stationary. This portion of the apparatus may be varied to conform to the standard types of core drives in use, and need not be further considered here.

The drum 12 is journaled at 16 upon a double lever 17 pivoted at its upper end by a bolt 18 in any one of a series of holes 19 in a bracket 20. By changing the hole in which the bolt is inserted adjustment may be made for the various sizes of tires which it may be desired to build upon the apparatus. At the lower end of the double lever, pivotal connection is made at 21 with a yoke 22, the other end of which is pivoted to arms 23 fixed upon a shaft 24 suitably journaled upon the base 25 of the machine. A treadle 26 is also fixed to this shaft, and furnishes means whereby the drum 12 can be moved towards or away from the core 13. A stop 27 prevents excess motion of the treadle, and consequently of the remaining linkage, in the outer or inactive position of the drum. The arrangement of yoke 22 and arms 23 shown, in which they are slightly beyond their straight line positions when the drum is inactive, causes the weight of the drum to hold the treadle against stop 27 until the parts are shifted out of this position by the operator.

Figure 1:
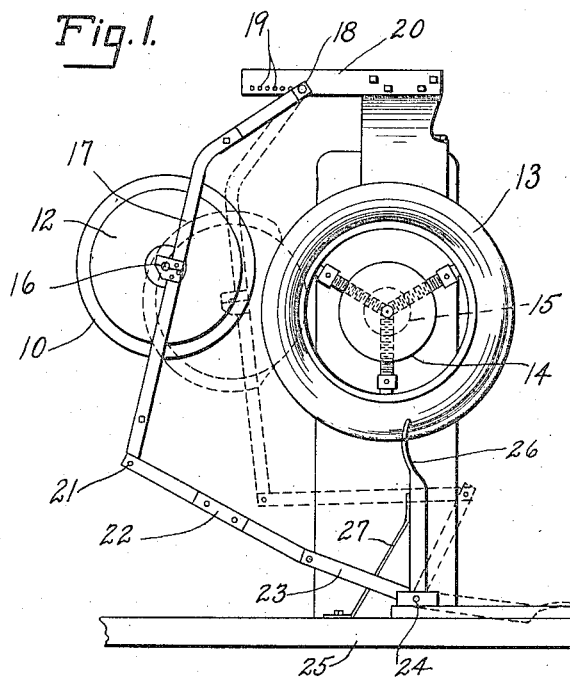
Fig. 1 is a side elevation of an apparatus embodying my invention.
Figure 2:
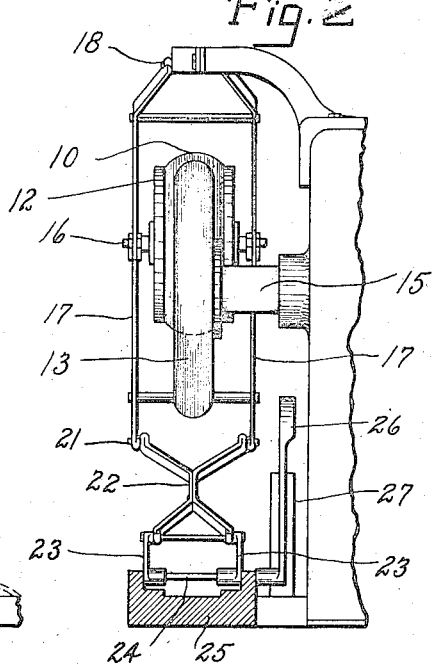
Fig. 2 is an elevation looking from the right in Fig. 1.
Figure 3:
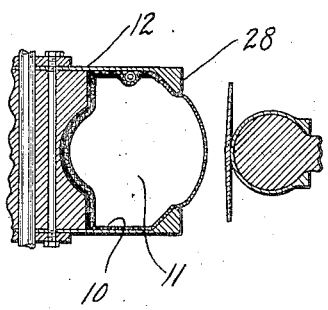
Fig. 3 is a section illustrating the construction of the device used for causing the tire building material to conform to the core or former, and also the arrangement of the material upon the former prior to the conforming operation.
Figure 4:
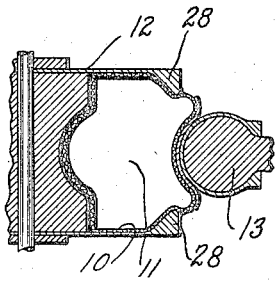
Fig. 4 is a similar section showing an intermediate stage in the conforming operation.
Figure 5:
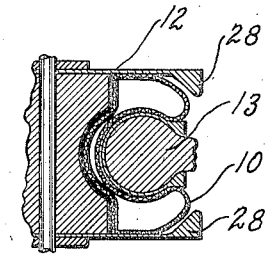
Fig. 5 is a similar section showing the final stage in the operation of the conforming device.

The operation of the above devices are as follows: With the parts in the full line position of Fig. 1 the drum and the bag thereon are out of range of the core 13 or any article thereon. When it is desired to bring the bag into action the treadle is moved towards the right in Fig. 1, or, what is usually more convenient, the yoke 22 is raised at its lower pivot by the foot of the operator, moving the drum and bag from the position of Fig. 3 to one substantially that of Fig. 4 in which the drum and bag rest upon the material upon the core by their own weight. The treadle is now depressed by the operator's foot, carrying the bag from the position of Fig. 4 to that of Fig. 5, the core meanwhile revolving to cause the material to be progressively acted upon. To restore the bag and drum to the inactive position it is only necessary to raise the treadle and press it towards the left in Fig. 1, carrying the treadle against stop 27. The arrangement of the parts is such that with the treadle in this position the yoke 22 and arms 23 extend slightly beyond their straight line position, so that what is in effect a toggle is formed serving to maintain the parts in the inactive position until again moved by the operator.

The bag 10 is preferably formed rather flat at its outer portion, so that the major portion of the bag is at all times within the boundaries of the recess 11. The latter preferably has a curved bottom portion (which may serve to cause direct pressure against the tread of the tire), permitting the bag to be pressed further down upon the core than would otherwise be the case, and substantially straight sides which furnish at all times a support for the bag and give backing for a considerable pressure against the sides of the core. A slight overhang 28 on each side of the recess serves to keep the bag in position and increase the effect of the flat sides of the recess.

Figure 7:
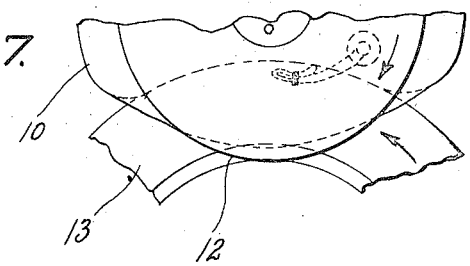
Fig. 7 is a side elevation thereof.

The action of the bag in stitching down upon the sides of a carcass on the core an uncured rubber tread will now be considered. As the bag is first pressed against the material on the core, the core being rotated at a uniform speed at the time, it exerts a progressive and yielding pressure, first against the center of the tire, and later, as the treadle is further and further depressed, against and down the sides of the tire. There will be two actions present during this combined motion of the bag and the core. In the first place there will be the yielding pressure of the fluid with which the bag is inflated, acting substantially normal to the surface of the core at successive points as the core is rotated. In the second place there will be a peculiar smoothing action, due to the working of the material of the bag as it rotates and progressively conforms to the shape of the core. This is illustrated in Fig. 7. The smoothing due to the gradual and progressive distortion of the bag acts in all directions on the material being shaped as the latter passes into and through the range of action of the bag, and thoroughly presses the material into contact with the curved sides of the core. As will be understood, the conforming of the material to the core necessitates a stretching of the material down the sides of the core, and an attendant contraction in a circumferential direction. This combined action is very efficiently accomplished by a bag constructed according to my invention, and at the same time the material is pressed at all points at each revolution of the core.

The method of building a tire including the use of the above described invention comprises the placing of the tire-forming material in encircling relation to the core (Figs. 3 and 6), as by stretching over the core an endless band of the material, or by applying a long strip of the material to the core as is customary in building tires according to prior hand methods, or by any other suitable means. The partially built tires on its core and with the band so mounted thereon is then located upon the chuck 14, and rotated. The treadle is now depressed slightly, and the bag permitted to rest lightly upon the tire until the conformation of the material has started, when the treadle is quickly depressed the remaining way. The core is allowed to rotate for a few revolutions with the bag in place, the bag moved out of contact, and the operation is complete.

In Figs. 9 to 14 I have shown modified forms of the invention in which the stitching device is adapted to serve also as means for placing the tire laminations upon the core. As the whole apparatus is especially designed for applying treads to tire carcasses, the modified form will also be described with particular reference to this use, although it is also applicable to the positioning of other laminations. In this form of the invention the drum 12 and the bag 10 are made substantially the same as in the case already described, with the bag in this instance slightly larger in circumference than the core. The manner of mounting the core and the bag may conveniently be left unchanged. The manner of applying the tread which I contemplate using consists in general in supplying the tread in strip form, clamping it to the bag with the position outermost that is to contact with the carcass, rolling the tread from the bag onto the carcass, and then using the bag as heretofore described to conform the tread to the side portions of the carcass.

In Figs. 8, 9 and 10 I have illustrated one form of clamp which may be used for holding the ends of the tread to the drum 12 when the latter is being used for applying the tread, previous to the forming operation. In this form of the holding apparatus the sides 28 of the drum are utilized as abutments against which the edges of the tread strip are pressed. By clamping the sides only of the strip the clamping devices can be located out of range of the bag so that during the operation of shaping the tread the clamping devices need not be moved.

The tread strips is placed (with its attaching side outwardly) on the drum 12 and its ends are clamped on the abutments 28 by the four lever operated clamps, one pair for each end. These are best shown in Figs. 9 and 10. The arms 40 are pivoted at 41. Each is provided at its outer end with an inwardly extending contact bar 42 to overlie the abutments 28 on opposite sides of the drum. When arms 40 are pressed downwardly, bars 42 engage the four corners of the tread strip and press them against the abutments. A handle operated toggle lever device is preferably used to manipulate each of the bars 40. One of these will be described. Arms 46 and 44 (Fig. 9) are mounted as a bell crank lever on pivot rod 45. Arm 43 connects arm 44 with the outer end of arm 40. A spring 47 is also fastened to arm 40 and the side of the drum 12 to urge the arm radially into clamping position. When the handle arm 46 is swung downwardly, the toggle 43—44 passes the center line and spring 47 holds the toggle in clamping position with the contact bar 42 pressing against abutment 28. By extending pivot rod 45 across the drum and keying it to the oppositely disposed toggle levers the clamps at opposite sides may be operated in pairs. It will be understood that there is one pair of clamps for each end of the tread.

In Figs. 11 to 14 I have illustrated a different arrangement in which the tread ends are clamped directly against the inflatable bag 10. At one side of the drum 12 I provide an arc shaped holder 50 with a series of spaced holes into which I can pin the journals of two spring rollers. The spring roller is shown in Fig. 13 in section, and in Figs. 11 and 14 in place. A fabric is fastened at one end to the roll 51 and then wound upon the roll. It is clear from Fig. 13 that if the fabric is then pulled in the right direction the roll will turn and wind its interior spring 52 which has one end fast to the support 53 while the other end is made fast to a closed end 54 of the roll. This is essentially a roller curtain arrangement without the catch device for different stops. On the side of the drum opposite the arc support 50 is an arc support 55 comprising a wire held spaced slightly from the side of the drum.

In this arrangement the tread is placed on the inflatable bag 10, a spring roller with a fabric roll thereon is adjusted adjacent each end of the tread. The fabric 60 is drawn under tension across the end of the tread and a metal hook 61 fixed to the end of the fabric is hooked on the support 55 (Fig. 14). The hook 61 is conveniently made of stamped metal with an ear bent from the metal for the hook proper and an ear bent in the opposite direction for a finger hold. Each end of the tread is clamped by a like arrangement of spring roller, fabric and hook.

In the operation of applying the tread to the carcass, the drum is brought into position for the tread to contact, the core and drum are then rolled together for the transfer. The inflatable bag is then used to form the tread to the carcass.

While a preferred form and certain modifications of the invention have been specifically disclosed, it is clear that the embodiment of means to accomplish the objects of the invention are susceptible to many equivalent specific forms. For this reason I desire to claim the essential features of the invention broadly.

Having thus described my invention, I claim:

1. A device for use in shaping tire building material to an annular core, comprising a drum having a circumferential recess, an inflated bag supported in the recess and being of a width and depth sufficient to permit it when pressed against the core to extend down the sides thereof, and devices for holding on the surface of the bag a strip of tire building material for transfer to the core.

MELVON A. MARQUETTE.